United States Patent [19]

Dunkel

[11] Patent Number: 5,118,245
[45] Date of Patent: Jun. 2, 1992

[54] TRANSVERSELY EXPANDABLE TRAILER

[76] Inventor: Mark Dunkel, 2120 Martin Rd., Tracy, Calif. 95376

[21] Appl. No.: 558,821

[22] Filed: Jul. 27, 1990

[51] Int. Cl.⁵ .............................................. B60P 3/06
[52] U.S. Cl. ................................ 414/537; 280/656; 280/638; 414/495
[58] Field of Search .................... 414/537, 538, 495; 280/840, 6.12, 287, 304, 404, 401, 491.1, 491.2, 638, 35, 42, 656, 43, 17, 43.22, 142; 296/7, 165, 170, 171, 175

[56] References Cited

U.S. PATENT DOCUMENTS

| | | | |
|---|---|---|---|
| 3,330,574 | 7/1967 | Kulyk | 280/656 |
| 3,406,980 | 10/1968 | Murray | 280/656 |
| 3,556,545 | 1/1971 | Van Raden | 280/656 |
| 3,698,734 | 10/1972 | Drake | 280/656 |
| 3,894,598 | 7/1975 | Yeou | 280/638 X |
| 4,119,224 | 10/1978 | Moody | 280/656 X |
| 4,221,398 | 9/1980 | Pautrat | 280/656 X |
| 4,336,889 | 6/1982 | McGrew | 280/638 X |
| 4,358,133 | 11/1982 | Stucky | 280/656 |

FOREIGN PATENT DOCUMENTS

| | | | |
|---|---|---|---|
| 2219447 | 12/1973 | Fed. Rep. of Germany | 280/638 |
| 3405259 | 8/1985 | Fed. Rep. of Germany | 280/656 |

*Primary Examiner*—Frank E. Werner
*Attorney, Agent, or Firm*—Julian Caplan

[57] ABSTRACT

A trailer suitable for hauling farm implements along highways is expandable from a contracted, empty position to an expanded loaded position. In expanded position, the rear support wheels are outside normal highway width limits. The trailer frame has a forward section, supported at its rear with centrally located ground wheels, and a pair of rear sections each supported by an outside wheel. Each rear section has a pair of transverse telescopic beams. One set of vertical hydraulic or pneumatic cylinders lifts the forward central wheels and the rear sections off the ground. A set of transverse cylinders moves the outside wheels to expanded position. Each outer rear beam section has a loading ramp hinged thereto about a transverse axle and a wheel support hinged thereto.

8 Claims, 1 Drawing Sheet ively along the line 4—4 of FIG. 2.

TRANSVERSELY EXPANDABLE TRAILER

BACKGROUND OF THE INVENTION

1. Field of the Invention

This invention relates to a new and improved expansible trailer used principally to haul farm implements such as swathers over highways. The outer rear wheels of the trailer are located on the outside of the trailer. In the retracted position of the trailer these wheels are spaced the normal distance of truck wheels but in expanded position the wheels are outside normal highway limits.

2. Description of Related Art

In the prior art, means for expanding trailer wheels are known. However the present invention provides a new and different means for expanding the wheels. More specifically the trailer wheels are pneumatically or hydraulically expanded after the lower end of the trailer has been lifted above the pavement.

SUMMARY OF THE INVENTION

The forward trailer frame is supported by one or more centrally located ground engaging wheels. Vertical pneumatic or hydraulic cylinders may be energized to lift the rear end of the trailer off the ground. The rear of the trailer is formed of two separate sections each of which is transversely expandable through a second set of pneumatic cylinders. Thus there are transverse telescopic beams on either side and the outer rear wheels of the trailer are mounted on structure which is supported by the outer ends of the telescopic beams.

The invention and objects and features thereof will be more readily apparent from the following detailed description and appended claims when taken with the drawing, in which:

DESCRIPTION OF THE PREFERRED EMBODIMENT

Figure 1:
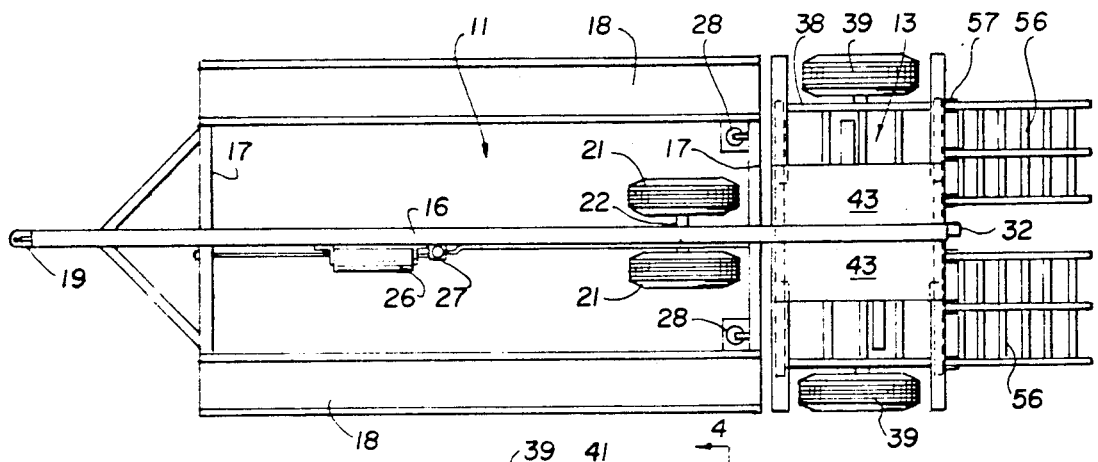
FIG. 1 is a top plan view of a trailer in accordance with the present invention in retracted position.

The present invention has a forward trailer section 11, a rear central section 12 and rear outer sections 13 all as best shown in FIG. 1. Extending longitudinally of the trailer is a central beam 16. In the forward section 11 there are transverse horizontal beams 17 fixed to beam 16 and supporting longitudinal wheel channels 18 spaced the normal width of the wheels of a swather or other agricultural implement. A trailer hitch 19 may be fixed to the forward end of beam 16. Adjacent the rear of forward section 11 are central ground support wheels 21 attached to beam 16 by stub axles 22.

Mounted in a convenient location on forward section 11 is an air receiving tank 26 which is charged with compressed air by any convenient means. The tank is connected to a pressure regulator 27. It will be understood that hydraulic power may be used instead of pneumatic. On either corner of the rear of forward section 11 is a vertical cylinder 28, the rod 29 of which is provided with a foot 31 engaging the ground. At the rear of the rear section is a control 32 used to energize the cylinder 28 from the tank 26.

Figure 2:
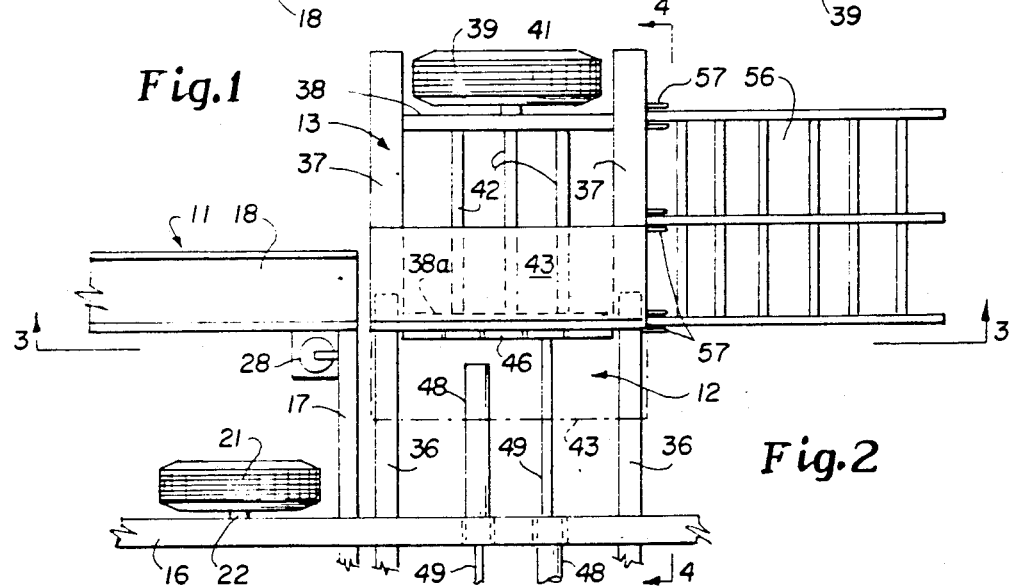
FIG. 2 is a fragmentary enlarged plan view showing the trailer in expanded position.
Figure 4:
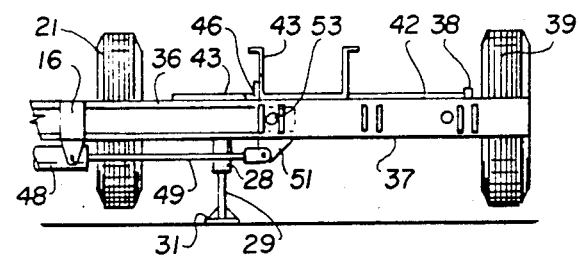
FIG. 4 is a transverse sectional view taken substantially along the line 4—4 of FIG. 2.
Figure 3:
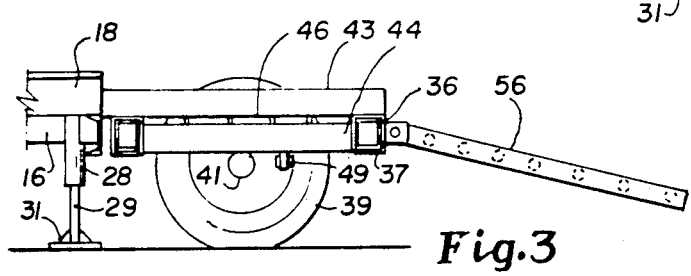
FIG. 3 is a fragmentary vertical sectional view taken substantially along the line 3—3 of FIG. 2.

The trailer is symmetrical about its central longitudinal axis which coincides with the beam 16. Therefore, as shown in FIGS. 2-4 and as hereinafter described, each side of the rear of the trailer is identical. Accordingly there is a pair of transverse inner beams 36 horizontally mounted to the central beam 16 and telescopically sliding thereon are transverse outer beams 37. The two beams 37 are interconnected by longitudinal outside beam 38 and inner beam 38a. Inner plate 43 is hinged to longitudinal beam 38a by hinge 46. There are several interconnecting transverse beams 42 connecting the members 38 and 38a. Mounted to the outer beam 38 by means of axle 41 is outside rear wheel 39.

Mounted on central beam 16 is a transverse horizontal pneumatic cylinder 48 also controlled by control 32 and the rod 49 thereof is pivotally attached to bracket 51 fixed to inner beam 38a. Thus when the cylinder 48 is energized, the members 38, 38a and 42 are moved outwardly to the position best shown in FIG. 4.

As a safety precaution, two holes 54 may be formed in each beam 37 and a single hole in the outer end of beam 36. A lock pin 53 may be inserted through the holes in the beams 36 and 37 to secure the same in either the position of FIG. 1 or the position of FIG. 2 and to prevent accidental dislodgement.

A conventional rear ramp 56 may be hinged by hinges 57 to the beam 37.

In operation, when the device is in the position shown in FIG. 1 and it is desired to expand the trailer, the lock pin 53 is removed. Thereupon by means of control 32, the cylinders 28 are first energized lifting the wheels 21 off the ground. Thereupon the cylinders 48 are energized causing the structure 38, 38a and 42 to be moved outward so that the outer beam 37 is telescopically extended relative to the inner beam 36 until the device reaches the position shown in FIGS. 2 and 4. It will be noted that the wheels 38 are off the ground. Thereupon the cylinders 28 are de-energized, lowering the wheels 21 and, 39 to the ground. Plate 43 is manually pivoted from an operative position shown in dot-and-dash lines in FIG. 2 to an operative position shown in solid lines. When in an operative position, plate 43 supports the swather as it moves from ramp 56 to channel 18 and vice versa. At this point the ramps 56 are manually lowered until their rear ends rest on the ground. The swather or other implement to be transported is then driven up the ramp 56, over plate 43 and onto the channels 18. After the ramps 56 have been hinged forwardly off the ground, the trailer may be pulled over fields and highways with the advantage that the wheels 39 are outermost. At the end of the haul, after the implement has been loaded off the trailer, the trailer may be returned to its original position.

What is claimed is:

1. A vehicle for transporting a wheeled implement of the type having implement wheels comprising a chassis having a forward section and a rear section, said forward section having a first wheel support on either side of said forward section for said wheels of said implement, said rear section having two opposed parts, each said part having a ground support wheel, a wheel mounting for said ground support wheel, means on each said part for supporting said part for transverse reciprocable movement of said part from an inner position to an outer position, and a second support on said part, said second support when said part is in outer position is longitudinally aligned with one said first support whereby said implement wheels may be moved onto said second supports and thence onto said first supports and said implement transported while said parts are in an outer position, and lifting means on each said part for raising said chassis so that said wheels are above ground level during movement of said parts between inner and outer positions, and at least one second wheel and means for mounting said second wheel on said forward section.

2. A vehicle according to claim 1 which further comprises fluid actuated means for moving said parts between said inner and outer positions.

3. A vehicle according to claim 1 which further comprises a longitudinal central member extending along both said forward and rear sections and including for each said part a first beam fixed transversely to said central member and a second beam slidably engaging said first member and fixed to one of said supporting means.

4. A vehicle according to claim 3 which further comprises a fluid actuated cylinder and rod extending transversely of said chassis fixed at one end of said central member and to said mounting means at a second end.

5. A vehicle according to claim 3 in which said first and second beams are telescopic mechanical hollow tubing members.

6. A vehicle according to claim 1 which further comprises a ramp on the back of each rear section extending from said second support to the ground.

7. A vehicle according to claim 6 which further comprises hinge means attaching said ramp to said second support.

8. A vehicle according to claim 1 in which said second support comprises a plate and hinge means pivotally mounting said plate to one said part for movement between vertical and horizontal positions.

* * * * *